(12) United States Patent
Beattie, Jr. et al.

(10) Patent No.: US 8,903,050 B2
(45) Date of Patent: Dec. 2, 2014

(54) NETWORK ANALYSIS BASED ON AMBIENT ELECTROMAGNETIC SIGNALS

(71) Applicant: AT&T Intellectual Property I, L.P., Atlanta, GA (US)

(72) Inventors: James Gordon Beattie, Jr., Bergenfield, NJ (US); Arvind R. Mallya, Walnut Creek, CA (US); Roque Rios, Haskell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 48 days.

(21) Appl. No.: 13/706,625

(22) Filed: Dec. 6, 2012

(65) Prior Publication Data

US 2014/0161236 A1    Jun. 12, 2014

(51) Int. Cl.
*H04M 1/24* (2006.01)
*H04M 3/22* (2006.01)
*H04M 3/28* (2006.01)
*H04M 3/30* (2006.01)

(52) U.S. Cl.
CPC .............. *H04M 3/2209* (2013.01); *H04M 3/28* (2013.01); *H04M 3/30* (2013.01)
USPC ...................................... 379/27.01

(58) Field of Classification Search
CPC ................................. H04M 3/30; H04M 3/28
USPC ........................................................ 379/27.01
See application file for complete search history.

(56) References Cited

U.S. PATENT DOCUMENTS

| | | | |
|---|---|---|---|
| 7,386,039 B2 * | 6/2008 | Afzal | 375/222 |
| 2002/0114383 A1 | 8/2002 | Belge et al. | |
| 2006/0182169 A1 | 8/2006 | Belge et al. | |
| 2011/0106588 A1 | 5/2011 | Beattie, Jr. et al. | |
| 2013/0022178 A1 * | 1/2013 | Rhee et al. | 379/32.04 |

* cited by examiner

*Primary Examiner* — Sonia Gay
(74) *Attorney, Agent, or Firm* — Toler Law Group, PC

(57) ABSTRACT

A particular method includes receiving first data indicating a measured strength of an ambient electromagnetic signal in a particular frequency range during a particular time period and at a particular location. The method also includes receiving second data indicating a bit loading within a portion of a wireline network in the particular frequency range during the particular time period. The portion of the wireline network provides service within a service area proximate to the particular location. The method also includes determining a correlation of changes in the second data during the particular time period to changes in the first data during the particular time period. The method further includes identifying at least one issue associated with the wireline network based on the correlation.

20 Claims, 4 Drawing Sheets

US 8,903,050 B2

NETWORK ANALYSIS BASED ON AMBIENT ELECTROMAGNETIC SIGNALS

FIELD OF THE DISCLOSURE

The present disclosure is generally related to wireline network analysis.

BACKGROUND

Wireline networks (such as telephone networks, digital subscriber line networks, cable networks, etc.) can be negatively impacted by signals propagating through free space. In particular, localized broad spectrum sources (such as small engines), despite having relatively low power can negatively impact service provided to customers of a nearby wireline network. For example, a small engine operated near a home may generate a broad spectrum electromagnetic signal that may be rectified and propagated through a portion of a wireline network. Many wide area wireline networks utilize adaptive bit loading to transmit data over particular frequencies based on the data rate available at each of those frequencies. Adaptive bit loading helps to prevent a reduction in capacity of a wireline network when the wireline network is subject to an electromagnetic signal that covers a narrow range of frequencies. When a particular home is impacted by a signal from a broad spectrum source, no channel may be available through which to route data in order to provide a desired level of service for the home because the broad spectrum electromagnetic signal covers a wide range of frequencies.

Because propagating signals in free space decrease in power over distance, broad spectrum signal sources that are particularly near a damaged or faulty component may cause more interference at the location of the damaged or faulty component than signal sources that are further away from the damaged or faulty component. Because the wireline network may use an adaptive bit loading technique to transmit signals over a frequency range that has available bandwidth, broad spectrum sources that prevent remapping of bit loading can be particularly problematic at the location of the damaged or faulty component.

DETAILED DESCRIPTION

Figure 1:
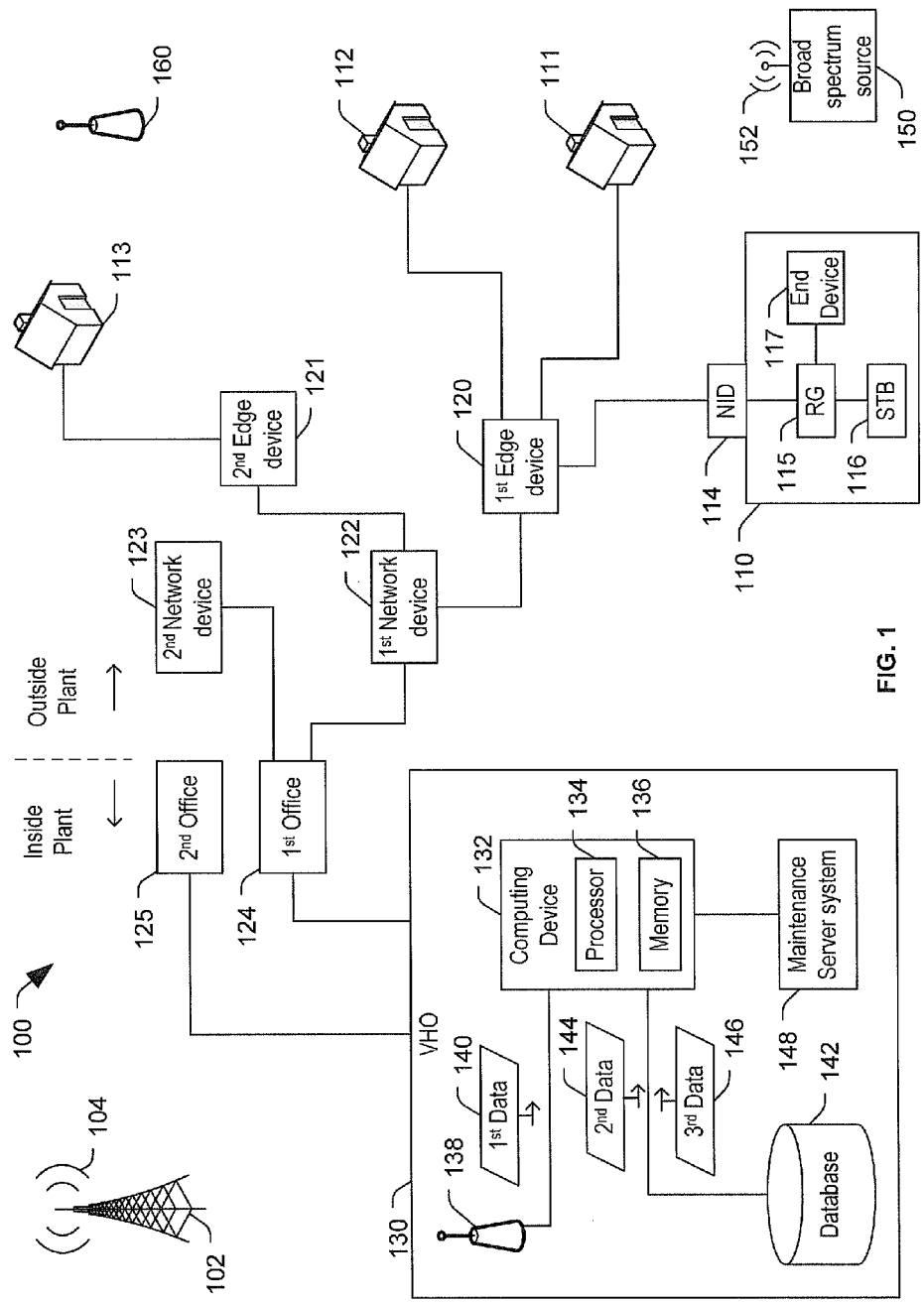
FIG. 1 is a diagram illustrating a particular embodiment of a wireline network.

According to an illustrative embodiment, a wireline network may be provided with components that are adapted to prevent electromagnetic signals that may be propagating through free space from propagating along the wireline network. Propagating free space signals, when rectified and propagated through the wireline network, may reduce the capacity of the wireline network. A damaged or faulty component may enable a propagating free space signal to be rectified, negatively affecting the wireline network.

An ambient electromagnetic signal (e.g., a high power transmission) from high power radio frequency sources, such as radio stations, government transmission stations (e.g., frequency and time signaling stations), shortwave transmission systems, etc., may be rectified and propagated through the wireline network, reducing the available bandwidth at a particular frequency. Such high power transmissions typically cover a narrow frequency range. Accordingly, adaptive bit rate loading may be utilized to avoid using frequency ranges associated with such transmissions in the wireline network.

A broad spectrum source may generate, for a period of time, a broad spectrum electromagnetic signal in proximity to the wireline network. The broad spectrum electromagnetic signal, like the high power transmission, may also be rectified and propagated through the wireline network. A portion of the wireline network that rectifies and propagates the high power transmission from the high power radio frequency sources may also rectify and propagate the broad spectrum electromagnetic signal when it occurs. By correlating data associated with the high power transmissions with bit loading data from the wireline network, the portion of the wireline network that rectifies and propagates the broad spectrum electromagnetic signal may be located, and preventative measures or repair may be undertaken to prevent the portion of the wireline network from rectifying and propagating the broad spectrum electromagnetic signal thereby enabling the wireline network to provide a desired level of service to a customer.

In a particular embodiment, bit loading changes associated with high power transmission sources can be utilized to identify damaged or faulty components of a wireline network (such as outside plant components including components remote from central offices of the wireline network). For example, by detecting a signal strength of a transmission from a high power transmission source in a particular geographic area, and also detecting bit loading at a frequency corresponding to the frequency of the transmission within the geographic area, and correlating measured changes in the signal strength of the transmission and bit loading at the corresponding frequency, areas in the wireline network that are affected by damaged or faulty components may be identified. Additionally, troubleshooting and/or repairing wireline network components may be prioritized. Other data may also be correlated with the bit loading data, the signal strength data, or a combination thereof, in order to discover a particular component or set of components associated with the interference issue. For example, customer complaints, adaptive bit loading data, re-initializations by customer premises equipment, noise detected at customer premises equipment, and other data may be correlated with the signal strength data and the bit loading data in order to identify a particular component, or components, associated with an issue in the wireline network.

In a particular embodiment, a method includes receiving first data indicating a measured strength of an ambient electromagnetic signal in a particular frequency range during a particular time period and at a particular location. The method also includes receiving second data indicating a bit loading within a portion of a wireline network in the particular frequency range during the particular time period. The portion of the wireline network provides service within a service area proximate to the particular location. The method also includes determining a correlation of changes in the second data during the particular time period to changes in the first data during the particular time period. The method further includes identifying at least one issue associated with the wireline network based on the correlation.

In a particular embodiment, a system includes a processor and a memory accessible to the processor. The memory including instructions executable by the processor to cause the processor to perform operations including receiving first data indicating a measured strength of an ambient electromagnetic signal in a particular frequency range during a particular time period and at a particular location. The operations also include receiving second data indicating a bit loading within a portion of a wireline network in the particular frequency range during the particular time period, where the portion of the wireline network provides service within a service area proximate to the particular location. The operations further include determining a correlation of changes in the second data during the particular time period to changes in the first data during the particular time period. The operations also include identifying at least one issue associated with the wireline network based on the correlation.

In a particular embodiment, a computer-readable storage device includes instructions executable by a processor to cause the processor to perform operations including receiving first data indicating a measured strength of an ambient electromagnetic signal in a particular frequency range during a particular time period and at a particular location. The operations further include receiving second data indicating a bit loading within a portion of a wireline network in the particular frequency range during the particular time period, where the portion of the wireline network provides service within a service area proximate to the particular location. The operations also include determining a correlation of changes in the second data during the particular time period to changes in the first data during the particular time period. The operations also include identifying at least one issue associated with the wireline network based on the correlation.

FIG. 1 depicts a particular embodiment of a wireline network 100. The wireline network 100 may correspond to a digital subscriber line network, a video digital subscriber line network, a cable network, a telephone network, or another wide area distributed wireline network. As illustrated in FIG. 1, the wireline network 100 is a hierarchical network that provides services to a plurality of customers, such as customers associated with residences, 110-113. A plurality of edge devices may provide the services to the customers. For example a first edge device 120 may provide services to residences 110-112 and a second edge device 121 may provide services to a fourth residence 113. The services may include communication services (e.g., telephony services, voice over internet protocol services), media services (e.g., television services, internet protocol television service, peer-to-peer media services, or other media services), data services (e.g., internet related services or other data transmission services), other services that can be provided via a customer service loop, or a combination thereof. The services may be provided using digital subscriber lines (DSL), coaxial cables, other conductor-based communication media, or hybrid systems that use conductor-based communication media as well as other communication media, such as optical fiber.

Each edge device 120, 121 may be associated with another network device at a higher level of hierarchy in the wireline network 100. For example, the first edge device 120 and the second edge device 121 may be associated with a first network device 122. Additionally, one or more other network devices, such as a second network device 123, may be associated with the wireline network. The first and second network devices 122 and 123 may be associated with other equipment of the wireline network, such as a first office 124. Additionally the wireline network 100 may include one or more other offices, such as a second office 125. The first office 124 and the second office 125 may each be associated with a higher level office, such as a video head-end office 130.

Although the wireline network 100 is illustrated as including the video head-end office 130, one or more other offices 124 and 125, one or more network devices 122 and 123, and one or more edge devices 120 and 121 in various embodiments, the wireline network may include more components, fewer components, or different components than illustrated in FIG. 1. For example, depending on the number of levels in the hierarchy and the particular location of the residences 110-113, the hierarchy of the wireline network 100 may include more levels or fewer levels. For example, the first office 124 may correspond to the video head-end office 130 in some embodiments. In a particular embodiment, the edge devices may include digital subscriber line multiplexors, advanced multimedia systems, routing devices, switches, cross boxes, video-ready access devices, another computing or routing devices, or any combination thereof. In a particular embodiment, the network devices 122, 123 may include or correspond to routing devices, switches, digital subscriber line multiplexors, cross boxes, video-ready access devices, other computing or routing devices, or any combination thereof.

FIG. 1 also illustrates a transmission source 102. The transmission source 102 may generate an ambient electromagnetic signal 104 (e.g., a propagating free space signal). The ambient electromagnetic signal 104 may be an amplitude modulated signal, a shortwave signal, a signal associated with a government transmitter (such as a radio or television broadcast, wireless network communication, global positioning system, frequency and time signal, etc.). When the ambient electromagnetic signal 104 encounters a damaged or faulty component of the wireline network 100 (as explained further below) the ambient electromagnetic signal 104 may be rectified and propagated via the wireline network 100. Thus, the ambient electromagnetic signal 104 may cause noise on the wireline network 100 at a particular frequency associated with the ambient electromagnetic signal 104, thereby limiting bandwidth available at the particular frequency.

To illustrate, the ambient electromagnetic signal 104 may be broadcast in a particular frequency range, at a particular time (or periodically), and from a location associated with the transmission source 102. The video head-end office 130 may transmit data, such as media data, control data, application data, electronic notices, emergency broadcast data, email, internet data, etc., via the wireline network 100 to the residences 110-113. The video head-end office 130 may use an adaptive bit rate technique in order to provide the data on a frequency that provides improved performance to the residences 110-113. For example, where interference is present on a particular frequency, the video head-end office 130 may route data via different frequencies in order to avoid, or reduce the impact of, the interference. Accordingly, when interference associated with the ambient electronic signal 104 is present on the wireline network 100, the video head-end office 130 may use the adaptive bit loading technique to avoid, or substantially avoid, a frequency range corresponding to a frequency range of the ambient electromagnetic signal 104.

Additionally, FIG. 1 illustrates a broad spectrum source 150. The broad spectrum source 150 may include any electrical or electromechanical device that generates a broad spectrum electromagnetic signal 152 (such as a small engine or motor, a household or industrial appliance, motorized landscaping tools, etc.). The broad spectrum electromagnetic signal 152 may cover a wide range of frequencies. Additionally, the broad spectrum electromagnetic signal 152 may be low power and may decrease in power over distance. The broad spectrum electromagnetic signal 152 may be rectified and propagate via the wireline network 100, reducing the quality of service to any residences 110-113 in close proximity to the broad spectrum source 150. For example, the residence 110 may be in close proximity to the broad spectrum source 150. Because the broad spectrum electromagnetic signal 152 may cover a wide range of frequencies, and because the residence 110 is in close proximity to the broad spectrum source 150, the bandwidth available in the wireline network 100 at the residence 110 may be significantly diminished, such that, even using adaptive bit loading, there may be no frequency through which to route data in order to provide a desired level of service for the residence 110.

Data indicating particular bit loading occurrences associated with each frequency range available to the video head-end office 130 may be stored at a database 142. The data may be provided by a device of the wireline network 100, such as one of the edge devices 120, 121, one of the network devices 122, 123, or one or more components of an office (e.g., the first office 124, the second office 125 or the video head-end office 130). The data may indicate particular frequency ranges and bit loading associated with those frequency ranges during a particular time period. Additionally, the bit loading data may indicate a particular device, devices, or areas associated with each bit loading. For example, when the first edge device 120 uses particular bit loading, the data may indicate that the bit loading is associated with the first edge device 120.

In a particular embodiment, the video head-end office 130 may utilize the interference caused by the ambient electromagnetic signal 104 to identify issues with the wireline network 100. For example, the video head-end office 130 may include or have access to a sensing system 138. The sensing system 138 may be adapted to determine or measure a signal strength of the ambient electromagnetic signal 104 at a location of the sensing system 138. The sensing system 138 may send first data 140 indicating the measured signal strength of the ambient electromagnetic signal 104 within a particular frequency range at particular periods of time.

The video head-end office 130 may also include or have access to a computing device 132 including at least one processor 134 and memory 136. The computing device 132 may receive the first data 140 indicating the measured signal strength of the ambient electromagnetic signal 104 and receive additional data in order to identify correlations between the ambient electromagnetic signal 104 and the other data in order to identify issues with the wireline network. For example, the computing device 132 may receive the first data 140 indicating the measured signal strength of the ambient electromagnetic signal 104 and second data 144 indicating bit loading within a portion of the wireline network 100 in a particular frequency range during the particular period of time. The portion of the wireline network may correspond to a service area serviced by the video head-end office 130. For example as illustrated in FIG. 1 the service area may include the residences 110-113.

The computing device 132 may determine correlations between the first data 140 and the second data 144 to identify issues with the wireline network 100. For example, the transmission source 102 may transmit the ambient electromagnetic signal 104 periodically. Accordingly, the first data 140 may indicate changes in the ambient electromagnetic signal 104 based on periodic transmissions from the transmission source 102. The second data 144 may indicate changes in bit loading on the wireline network 100 in the frequency range associated with the ambient electromagnetic signal 104 that corresponds to the changes in the ambient electromagnetic signal 104. That is, when the transmission source 102 is transmitting the ambient electromagnetic signal 104, there may be a corresponding change in bit loading indicated by the second data 144 on the wireline network 100. When there is a corresponding change in bit loading that corresponds to the change in the ambient electromagnetic signal 104, the computing device 132 may indicate that an issue is identified.

When a change in the bit loading is associated with a particular area of the wireline network 100, the computing device 132 may be able to identify the particular area corresponding to the issue. To illustrate, the first edge device 120 may use the adaptive bit loading technique to send data to the residences 110-112, and the second data 144 may indicate that the first edge device 120 modified bit loading to avoid a frequency range associated with the ambient electromagnetic signal 104 during transmission of the ambient electromagnetic signal 104. The modification of the bit loading by the first edge device 120 may indicate that the first edge device 120 was avoiding the frequency range associated with the ambient electromagnetic signal 104 due to interference in that frequency range by the ambient electromagnetic signal 104. The second edge device 121 may also use the adaptive bit loading technique. When the second edge device 121 did not perform adaptive bit loading to avoid the frequency range associated with the ambient electromagnetic signal 104 while the ambient electromagnetic signal 104 was being transmitted, this may indicate to the computing device 132 that a problem exists in a portion of the wireline network 100 serviced by the first edge device 120.

Other data may also be used by the computing device 132 in order to further identify a portion of the wireline network 100 associated with the issue, to identify a particular device associated with the issue, or to identify further problems. For example, the database 142 may provide third data 146 to the computing device 132. The third data 146 may include other metrics of performance associated with portions of the wireline network 100. For example, the other metrics of performance may include customer complaint history data, a count of re-initialization requests from customer premises equipment devices, noise measurements from customer premises equipment devices, or combinations thereof. For example, the residence 110 as illustrated includes a plurality of customer premises devices including a network interface device 114, a residential gateway 115, a set top box 116, and another end device 117. In a particular embodiment, one or more of the customer premises devices 114-117 may measure noise associated with received data on the wireline network 100. The customer premises device(s) may provide the noise measurement data to the video head-end office 130 which may store the noise measurement data at the database 142.

Additionally, the video head-end office 130 may be associated with or coupled to a customer service center that is adapted to receive customer complaints associated with service of the wireline network 100. The database 142 may include the customer complaint data. Thus, by correlating the third data 146 with the first data 140 and/or the second data 144, the computing device 132 may identify or prioritize issues within the wireline network 100.

The computing device 132 may also prioritize repairs to the wireline network 100 based on the correlation or correlations. For example, strong correlations between the first data 140 and the second data 144 may be indicative of a significant number of problems or a severe problem. Accordingly, the computing device 132 may assign a higher priority for repairs associated with components at locations associated with a strong correlation between the first data 140 and the second data 144. In another example, a strong correlation between the first data 140 and the third data 146 may indicate that a particular customer has a severe problem associated with the wireline network 100. Accordingly, the particular customer may be assigned a higher priority for repair than another customer. Issues may also be prioritized for repair based on other factors, such as the number of customers affected with the issue, revenue associated with customers affected by the issue, or combinations thereof. For example, in FIG. 1, the second edge device 121 is illustrated as providing service to the fourth residence 113. Conversely, the first edge device 120 is illustrated as providing service to the first, second, and third residences 110-112. Accordingly, when both the first edge device 120 and the second edge device 121 have issues, a higher priority may be associated with the first edge device 120 in order to provide improved service to more customers.

In one embodiment, the video head-end office 130 may include or have access to a maintenance server system 148. The computing device 132 may provide data associated with identified issues to the maintenance server system 148. The maintenance server system 148 may generate repair tickets and schedule a repair of an identified issue based on the priority of the issue as described herein. The maintenance server system 148 may be located in the video head-end office 130, or the maintenance server system 148 may be located remotely from the video head-end office 130.

Although the sensing system 138 is illustrated as being associated with the video head-end office 130, in a particular embodiment, the sensing system 138 or a portion of the sensing system 138 may be remote from the video head-end office 130. For example, a second sensing system 160 is illustrated in FIG. 1. The second sensing system 160 may be remote from the video head-end office 130. In a particular embodiment, the second sensing system 160 may be located remote from or proximate to one or more residences served by the wireline network 100. For example, the second sensing system 160 may be a component of a customer premises equipment device, such as the residential gateway 115, the set top box 116, the end device 117, or the network interface device 114. The second sensing system 160 may provide information to the computing device 132, to another component of the video head-end office 130, or to another component of the wireline network 100, via the wireline network 100 or via a separate communication path such as a wireless communication path or a separate wireline network (not shown).

In a particular embodiment, the wireline network 100 includes an inside plant portion and in outside plant portion. For example, the inside plant portion may correspond to one or more offices, such as the first office 124, the second office 125, the video head-end office 130, and communications between and among those offices. The outside plant portion may correspond to devices that are external to and remote from one or more of the offices, such as the edge devices 120-121, the first and second network device 122-123 and one or more customer premises devices. In a particular embodiment, the computing device 132 may use correlations between the first data 140 and the second data 144 to determine whether an issue is associated with an inside plant problem or an outside plant problem. The issue may indicate a vulnerability of a portion of the outside plant portion of the wireline network 100 to the ambient electromagnetic signal 104. When the issue indicates a vulnerability to the ambient electromagnetic signal 104, the issue may also indicate a vulnerability to the broad spectrum electromagnetic signal 152. For example, the computing device 132 may use the correlations to determine that an issue is associated with the first edge device 120 (which is an outside plant portion of the wireline network 100). The issue may indicate that the first edge device 120 is vulnerable to interference from the ambient electromagnetic signal 104. When the first edge device 120 is vulnerable to interference from the ambient electromagnetic signal 104, the first edge device may also be vulnerable to interference from the broad spectrum electromagnetic signal 152. Accordingly, an issue with the first edge device 120 may be noted, and corrective action may be taken (e.g., a work order to repair or replace the first edge device 120 may be generated).

Figure 2:
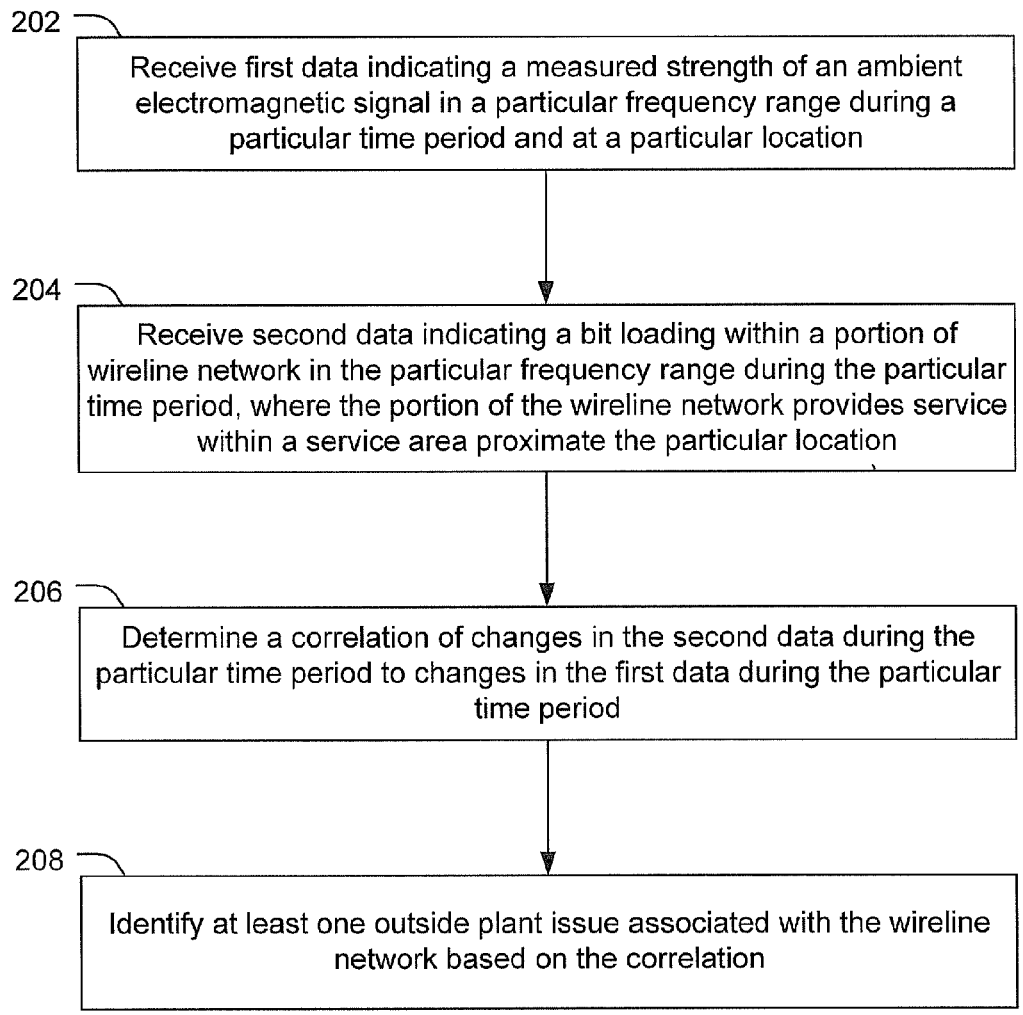
FIG. 2 is a flowchart of a first particular embodiment of analyzing the wireline network of FIG. 1 based on ambient electromagnetic signals.

FIG. 2 illustrates a particular embodiment of a method of identifying at least one issue associated with a wireline network. The method may include, at 202, receiving first data indicating a measured strength of an ambient electromagnetic signal in a particular frequency range during a particular time period and at a particular location. For example, referring to the wireline network 100 of FIG. 1, the sensing system 138 or the second sensing system 160 may detect the ambient electromagnetic signal 104 from the transmission source 102 at a particular time. The ambient electromagnetic signal 104 may be associated with a particular, relatively narrow, frequency range. For example, bit loading may be used within the wireline network to avoid interference caused by the ambient electromagnetic signal 104. The sensing system 138 or the second sensing system 160 may provide the first data 140 to a computing device 132, to the database 142, or to another component of the wireline network 100 or of the video head-end office 130.

The method may also include, at 204, receiving second data indicating bit loading within a portion of the wireline network in the particular frequency range during the particular time period. The portion of the wireline network may provide service within a service area that is proximate to the particular location. For example, referring to the wireline network 100 of FIG. 1, the computing device 132 may receive the second data 144 indicating the bit loading associated with a particular portion of the wireline network 100. Bit loading data of the second data 144 may be provided by a device of the wireline network 100, such as one of the edge devices 120, 121 one of the network devices 122, 123, or one or more components of an office (e.g., the first office 124, the second office 125, or the video head-end office 130). The bit loading data may indicate particular frequency ranges and bit loading within the wireline network 100 at the particular frequency ranges during a particular time period. For example, the second data 144 may indicate bit loading associated with each frequency range, or channel, associated with the wireline network 100 during a time corresponding to a transmission time of the ambient electromagnetic signal 104. Additionally, the bit loading data may indicate a particular device, devices, or areas associated with each bit loading. For example, when the first edge device 120 uses particular bit loading, the second data 144 may indicate that the bit loading is associated with the first edge device 120 or associated with providing service to the residence 110.

The method may also include, at 206, determining a correlation of changes in the second data during the particular time period to changes in the first data during the particular time period. For example, the computing device 132 of FIG. 1 may correlate the first data 140 and the second data 144 to identify locations and times when bit loading changes occurred that correspond to transmissions of the ambient electromagnetic signal 104. That is, the computing device 132 may determine or attempt to identify when bit loading changes occurred as a result of interference by the ambient electromagnetic signal 104.

The method may also include, at 208, identifying at least one outside plant issue associated with the wireline network based on the correlation. For example, the computing device 132 of FIG. 1 may identify an issue in the wireline network 100 at one or more of the premises 110-113, the first edge device 120, the second edge device 121, the first network device 122, and the second network device 123.

By correlating a change in a measured strength of an ambient electromagnetic signal in a particular frequency range, during a particular time, and at a particular location with a change in bit loading data within a portion of a wireline network, in the particular frequency range, and during the particular time period, the location of a damaged or faulty component may be determined to be within the portion of the wireline network. Thus, repairs or corrections may be made to the wireline network such that the effects of a broad spectrum electromagnetic signal from a broad spectrum source in proximity to the wireline network may be reduced.

Figure 3:
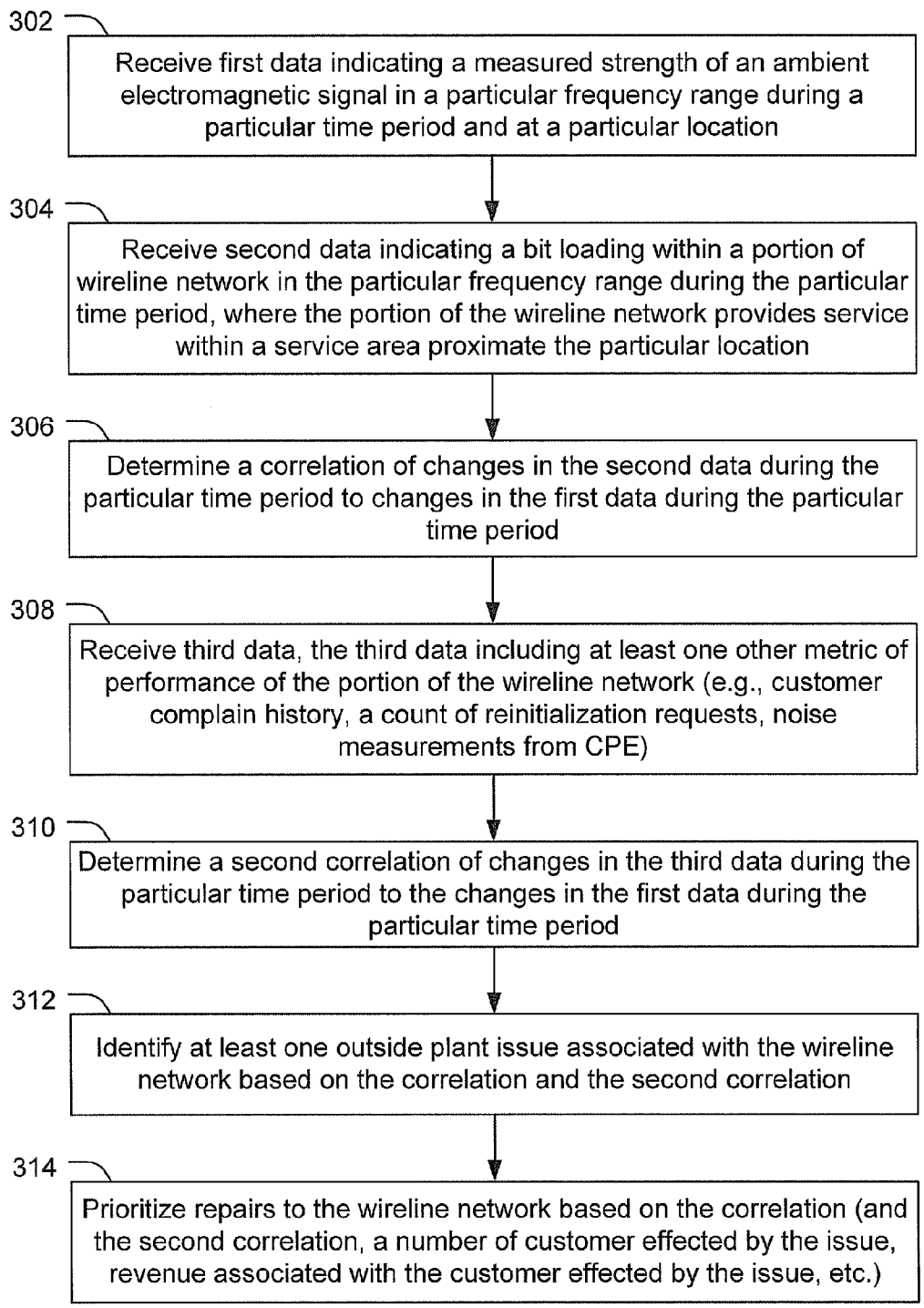
FIG. 3 is a flowchart of a first particular embodiment of analyzing the wireline network of FIG. 1 based on ambient electromagnetic signals.

FIG. 3 illustrates another embodiment of a method of identifying at least one issue associated with a wireline network. The method may include, at 302, receiving first data indicating a measured strength of an ambient electromagnetic signal in a particular frequency range during a particular time period and at a particular location. For example, referring to the wireline network 100 of FIG. 1, the sensing system 138 or the second sensing system 160 may detect the ambient electromagnetic signal 104 from the transmission source 102 at a particular time. The ambient electromagnetic signal 104 may be associated with a particular, relatively narrow, frequency range. The sensing system 138 or the second sensing system 160 may provide the first data to a computing device 132, to the database 142, or to another component of the wireline network 100 or of the video head-end office 130.

The method may also include, at 304, receiving second data indicating bit loading within a portion of the wireline network in the particular frequency range during the particular time period. The portion of the wireline network may provide service within a service area that is proximate to the particular location. For example, referring to the wireline network 100 of FIG. 1, the computing device 132 may receive the second data 144 indicating the bit loading associated with a particular portion of the wireline network 100. Bit loading data of the second data 144 may be provided by a device of the wireline network 100, such as one of the edge devices 120, 12,1 one of the network devices 122, 123, or one or more components of an office (e.g., the first office 124, the second office 125 or the video head-end office 130). The bit loading data may indicate particular frequency ranges and bit loading within the wireline network 100 at the particular frequency ranges during a particular time period. For example, the second data 144 may indicate bit loading associated with each frequency range, or channel, associated with the wireline network 100 during a time corresponding to the transmission time of the ambient electromagnetic signal 104. Additionally the bit loading data may indicate a particular device, devices, or areas associated with each bit loading. For example, when the first edge device 120 uses particular bit loading, the second data 144 may indicate that the bit loading is associated with the first edge device 120 or associated with providing service to the residence 110.

The method may also include, at 306, determining a correlation of changes in the second data during the particular time period to changes in the first data during the particular time period. For example, the computing device 132 of FIG. 1 may correlate the first data 140 and the second data 144 to identify locations and times when bit loading changes occurred that correspond to transmissions of the ambient electromagnetic signal 104. That is, the computing device 132 may determine or attempt to identify when bit loading changes occurred as a result of interference by the ambient electromagnetic signal 104.

The method may also include, at 308, receiving third data, the third data including at least one other metric of performance of the portion of the wireline network. For example, referring to the wireline network 100 of FIG. 1, the computing device 132 may receive the third data 146 indicating metrics of performance. The metrics of performance may include customer complaint history data, a count of re-initialization requests from customer premises equipment devices, noise measurements from customer premises equipment devices, results of automated testing, or combinations thereof. The third data 146 may be provided to the computing device 132 by a device of the wireline network 100, such as one of the edge devices 120, 121, one of the network devices 122, 123, or one or more components of an office (e.g., the first office 124, the second office 125 or the video head-end office 130). In one embodiment, the computing device 132 may receive the third data 146 from a database, such as the database 142 that stores data concerning the metrics of performance.

For example, in FIG. 1, the residence 110 includes a plurality of customer premises devices including the network interface device 114, the residential gateway 115, the set top box 116, and the end device 117. In a particular embodiment, one or more of the customer premises devices 114-117 may measure noise on the wireline network 100 associated with received data. The customer premises device may provide the noise measurement data to the video head-end office 130, which that may store the noise measurement data at the database 142. Additionally the video head-end office 130 may be associated with or coupled to a customer service center that is adapted to receive customer complaints associated with service of the wireline network 100. The database 142 may include the customer complaint data. The database 142 may also store account or reinitialization requests received by the video head-end office 130 from customer premises equipment devices.

Returning to FIG. 3, the method may also include, at 310, determining a second correlation of changes in the third data during the particular time period to the changes in the first data during the particular time period. For example, the computing device 132 of FIG. 1 may correlate the first data 140 and the third data 146 to identify locations and times when performance metric data (e.g., customer complaint history data, a count of re-initialization requests from customer premises equipment devices, noise measurements, etc.) corresponded to transmissions of the ambient electromagnetic signal 104. That is, the computing device 132 may determine or attempt to identify when performance metric data was received as a result of interference by the ambient electromagnetic signal 104.

The method may also include, at 312, identifying at least one outside plant issue associated with the wireline network based on the correlation and the second correlation. For example, using the correlation and the second correlation, the computing device 132 of FIG. 1 may identify an issue in the wireline network 100 at one or more of the premises 110-113, the first edge device 120, the second edge device 121, the first network device 122, the second network device 123, or line or fiber there between.

The method may also include, at 314, prioritizing repairs to the wireline network based on the correlation. In prioritizing repairs, the method may also consider the second correlation, a number of customers affected by the issue, revenue associated with the customers affected by the issue, other factors, or a combination thereof. For example, the computing device 132 may prioritize repairs to the wireline network 100 based on the strength of the correlations between the first data 140 and the second data 144. The computing device 132 may assign a higher priority to repairs associated with a strong correlation between the first data 140 and the second data 144. In another example, a strong correlation between the first data 140 and the third data 146 may indicate that a particular customer has a severe problem associated with the wireline network 100. Accordingly, the particular customer may be assigned a higher priority to repair than another customer. Issues may also be prioritized to repair based on other factors, such as the number of customers affected with the issue, revenue associated with customers affected by the issue, or combinations thereof. For example, in FIG. 1, the second edge device 121 is illustrated as providing service to the fourth residence 113. Conversely, the first edge device 120 is illustrated as providing service to the first, second, and third residences 110-112. Accordingly when both the first edge device 120 and the second edge device 121 have issues, a higher priority may be associated with the first edge device 120 in order to provide improved service to more customers.

Figure 4:
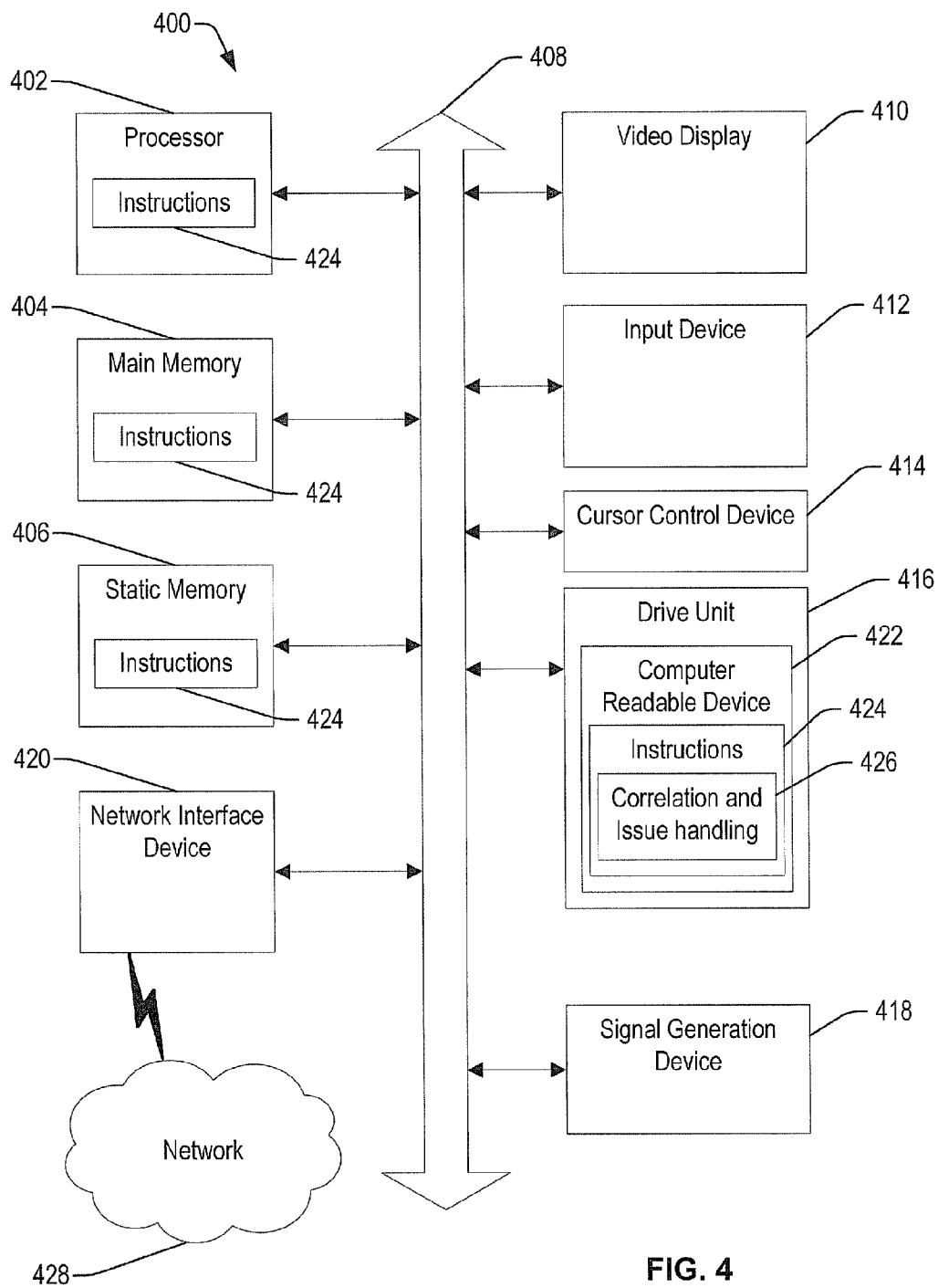
FIG. 4 is a block diagram of an illustrative embodiment of a general computer system operable to support embodiments of computer-implemented methods, computer program products, and system components as illustrated in FIGS. 1-3.

Referring to FIG. 4, an illustrative embodiment of a general computer system is shown and is designated 400. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include, be included within, or correspond to one or more of the components of the wireline network 100, or a combination thereof described with reference to FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a STB, a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 400 may be implemented using electronic devices that provide video, audio, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be the processor 134 of FIG. 1, another processor of an element of the wireline network 100 of FIG. 1, or a combination thereof. Moreover, the computer system 400 may include a main memory 404 and a static memory 406 that can communicate with each other via a bus 408. For example, the main memory 404 may be the memory 136 of FIG. 1, another memory of an element of the wireline network 100 of FIG. 1, or a combination thereof. As shown, the computer system 400 may further include a video display unit 410, such as a liquid crystal display (LCD), a flat panel display, a solid state display, or a lamp assembly of a projection system. Additionally, the computer system 400 may include an input device 412, such as a keyboard, and a cursor control device 414, such as a mouse. The computer system 400 may also include a drive unit 416, a signal generation device 418, such as a speaker or remote control, and a network interface device 420. Some computer systems 400 may not include an input device (e.g., a server may not include an input device).

In a particular embodiment, as depicted in FIG. 4, the drive unit 416 may include a computer-readable storage device 422 in which one or more sets of instructions 424, e.g., software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable storage device 422 that stores the instructions 424 or receives, stores, and executes the instructions 424, so that a device connected to a network 426 may communicate voice, video or data over the network 426. For example, the device may include or be included within one or more of the components of the wireline network 100, or a combination thereof described with reference to FIG. 1. While the tangible computer-readable storage device 422 is shown to be a single device, the tangible computer-readable storage device 422 may include a single medium or multiple media, such as a centralized or distributed database, and/or associated caches and servers that store one or more sets of instructions. The tangible computer-readable storage device 422 may include any tangible medium that is capable of storing a set of instructions for execution by a processor or that cause a computer system to perform any one or more of the methods or operations disclosed herein.

In a particular non-limiting, exemplary embodiment, the tangible computer-readable storage device 422 may include a solid-state memory such as a memory card or other package that houses one or more non-volatile read-only memories. Further, the tangible computer-readable storage device 422 may be a random access memory or other volatile re-writable memory. Additionally, the tangible computer-readable storage device 422 may include a magneto-optical or optical medium, such as a disk or tapes or other storage device. Accordingly, the disclosure is considered to include any one or more of a tangible computer-readable storage device and other equivalents and successor media, in which data or instructions may be stored.

Although the present specification describes components and functions that may be implemented in particular embodiments with reference to particular standards and protocols, the disclosed embodiments are not limited to such standards and protocols. For example, standards and protocols for communication include real-time transport protocol (RTP), transmission control protocol (TCP)/internet protocol (IP), user datagram protocol (UDP)/internet protocol (IP), or a combination thereof. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, at a processor, first data indicating a measured strength of an ambient electromagnetic signal in a particular frequency range during a particular time period and at a particular location;

receiving, at the processor, second data indicating a bit loading within a portion of a wireline network in the particular frequency range during the particular time period, wherein the portion of the wireline network provides service within a service area proximate to the particular location;

determining, at the processor, a correlation of changes in the second data during the particular time period to changes in the first data during the particular time period; and identifying, at the processor, an issue associated with the wireline network based on the correlation.

2. The method of claim 1, wherein the issue indicates vulnerability of the portion of the wireline network to broad frequency spectrum electromagnetic noise sources.

3. The method of claim 1, further comprising prioritizing repairs to the wireline network based on the correlation.

4. The method of claim 3, wherein the repairs to the wireline network are further prioritized based on a number of customers affected by the issue, revenue associated with the customers affected by the issue, or a combination thereof.

5. The method of claim 1, further comprising:

receiving third data, the third data including a metric of performnance of the portion of the wireline network, wherein the third data is different than the first data; and determining a second correlation of changes in the third data during the particular time period to the changes in the first data during the particular time period, wherein the issue associated with the wireline network is identified further based on the second correlation.

6. The method of claim 5, wherein the metric of performance of the portion of the wireline network includes customer complaint history.

7. The method of claim 5, wherein the metric of performance of the portion of the wireline network includes a count of reinitialization requests received from customer premises equipment devices.

8. The method of claim 5, wherein the metric of performance of the portion of the wireline network includes noise measurements from customer premises equipment devices.

9. The method of claim 1, wherein the strength of the ambient electromagnetic signal is measured at a sensing system associated with a video head-end office of the wireline network, wherein the video head-end office provides service via the wireline network to customers within the service area.

10. The method of claim 1, wherein the strength of the ambient electromagnetic signal is measured at a customer premises device.

11. The method of claim 1, wherein the ambient electromagnetic signal includes an amplitude modulated signal, a shortwave signal, or a signal associated with a government transmitter.

12. The method of claim 1, wherein the issue is related to a damaged or faulty component of the wireline network that causes rectification of the ambient electromagnetic signal.

13. A system comprising:

a processor; and a memory accessible to the processor, the memory including instructions executable by the processor to cause the processor to perform operations including:

receiving first data indicating a measured strength of an ambient electromagnetic signal in a particular frequency range during a particular time period and at a particular location;

receiving second data indicating a bit loading within a portion of a wireline network in the particular frequency range during the particular time period, wherein the portion of the wireline network provides service within a service area proximate to the particular location;

determining a correlation of changes in the second data during the particular time period to changes in the first data during the particular time period; and identifying an issue associated with the wireline network based on the correlation.

14. The system of claim 13, wherein the issue indicates vulnerability of the portion of the wireline network to broad frequency spectrum electromagnetic noise sources.

15. The system of claim 13, wherein the operations further comprise prioritizing repairs to the wireline network based on the correlation.

16. The system of claim 13, wherein the operations further comprise:

receiving third data, the third data including a metric of performance of the portion of the wireline network, wherein the third data is different than the first data; and determining a second correlation of changes in the third data during the particular time period to the changes in the first data during the particular time period, wherein the issue associated with the wireline network is identified further based on the second correlation.

17. The system of claim 13, wherein the issue is related to a damaged or faulty component of the wireline network that causes rectification of the ambient electromagnetic signal.

18. A computer-readable memory device comprising instructions executable by a processor to cause the processor to perform operations including:

receiving first data indicating a measured strength of an ambient electromagnetic signal in a particular frequency range during a particular time period and at a particular location;

receiving second data indicating a bit loading within a portion of a wireline network in the particular frequency range during the particular time period, wherein the portion of the wireline network provides service within a service area proximate to the particular location;

determining a correlation of changes in the second data during the particular time period to changes in the first data during the particular time period; and identifying an issue associated with the wireline network based on the correlation.

19. The computer-readable memory device of claim 18, wherein the issue indicates vulnerability of the portion of the wireline network to broad frequency spectrum electromagnetic noise sources.

20. The computer-readable memory device of claim 18, wherein the operations further comprise prioritizing repairs to the wireline network based on the correlation.

\* \* \* \* \*